Dec. 4, 1956     G. H. VOGT     2,773,210
RETAINING RING STRUCTURE FOR END WINDINGS
OF DYNAMOELECTRIC MACHINE
Filed Aug. 29, 1955
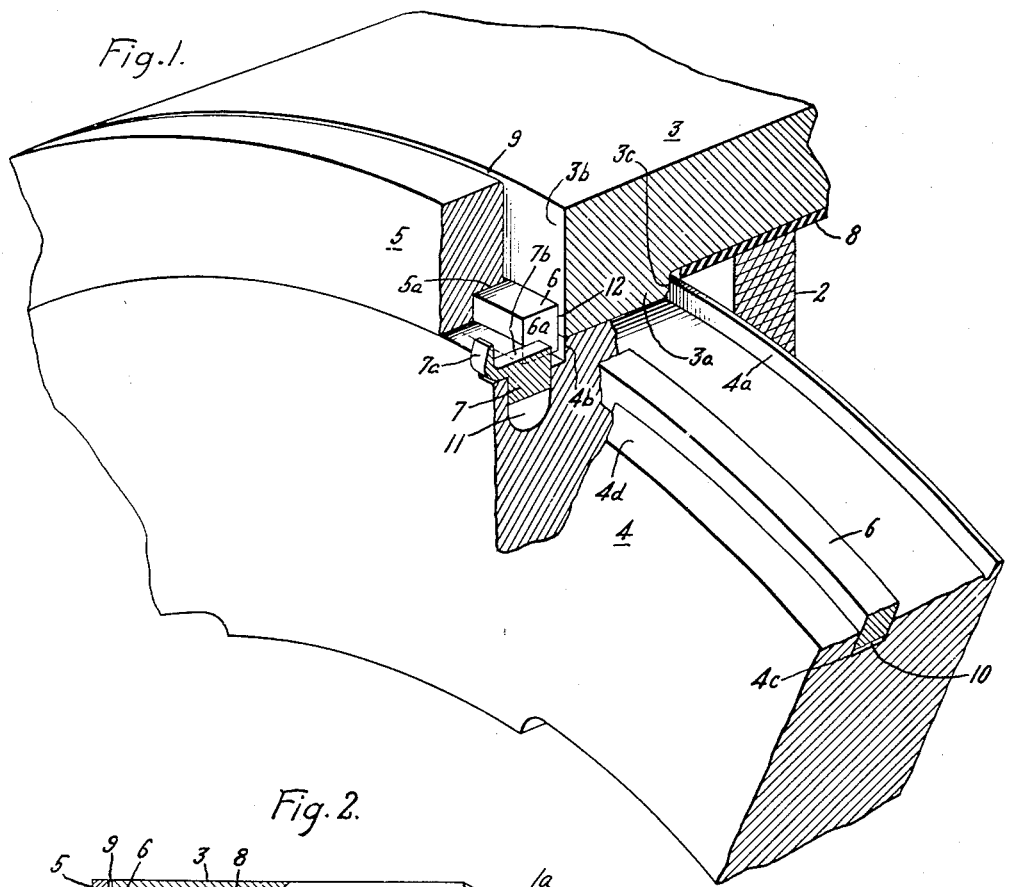
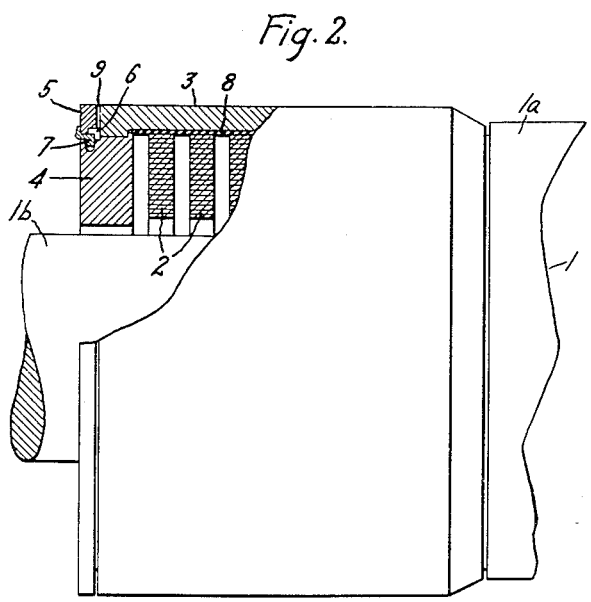
Inventor:
George H. Vogt
by Kiess
His Attorney United States Patent Office 2,773,210
Patented Dec. 4, 1956

2,773,210

RETAINING RING STRUCTURE FOR END WINDINGS OF DYNAMOELECTRIC MACHINE

George H. Vogt, Wakefield, Mass., assignor to General Electric Company, a corporation of New York Application August 29, 1955, Serial No. 531,210

5 Claims. (Cl. 310—270)

This invention relates to dynamoelectric machines, particularly to an improved retaining ring structure for supporting the end portions of the rotor windings in large turbine-driven generators. The typical rotor construction of a synchronous generator consists of a solid steel shaft of large diameter which is axially slotted to accept current-carrying windings. The ends of the shaft are reduced in diameter to alloy the end portions of the conductors to extend circumferentially through an arc around the reduced diameter portions to form closed coils. These coil ends are retained in place against centrifugal forces by a retaining ring.

Retaining rings have been mounted on the rotor by means of a shrink fit between the retaining ring and a "centering ring" shrunk onto the reduced shaft diameter adjacent the bearing. The shrink fit between the retaining ring and the centering ring prevents the retaining ring from moving circumferentially. Also, the retaining ring must be prevented from moving axially on the shaft under the forces developed by the windings as they expand. This has been accomplished by utilizing wedges or other types of locking means disposed in axial or circumferential grooves, notches, or radial holes in the retaining ring and adjacent centering ring.

Previous arrangements utilized have resulted in stress concentrations which created a serious hazard in the already highly stressed retaining ring. In addition, the retaining rings were difficult to assemble and disassemble.

Accordingly, an object of the present invention is to provide a structure which firmly locks the retaining ring against axial movement without the necessity of notches, holes or other "stress raisers" in the highly stressed retaining ring.

Another object is to provide an improved generator retaining ring construction made of few parts which is comparatively easy to assemble and disassemble.

Other objects and advantages will become apparent from the following description taken in connection with the accompanying drawings, in which Fig. 1 is a perspective view of an improved generator retaining ring construction, in accordance with the invention, and Fig. 2 is a sectional view showing in greater detail the relation between the various parts of the novel retaining ring assembly and the rotor.

Generally stated, the invention is practiced by providing a snap ring disposed adjacent the retaining ring and in a groove in the centering ring for transmitting the axial thrust imposed by the windings on the retaining ring assembly to the centering ring, which is secured to the rotor. The snap ring is held in position by a clamp ring shrunk onto the end of the centering ring.

Referring now more particularly to the drawings, the invention is shown as applied to a generator rotor, indicated generally at 1, having a cylindrical body portion 1a and a small diameter rotor shaft end portion 1b. The electrical winding comprises a plurality of conductor bar structures disposed in slots (not shown) in the rotor body and having end portions shown generally at 2. These winding end portions are supported against the action of centrifugal force by the high strength retaining ring 3. Insulating tube 8 separates the windings from the retaining ring 3.

Very large stresses are imposed on the retaining ring as the result of the centrifugal forces acting on the winding end portions. At the same time, thermal expansion of the conductor bars causes the end portions to attempt to move axially as the generator comes up to normal operating temperature. The very substantial friction force between the end turns and the retaining ring, taken in combination with the thermal expansion of the bars, results in a very strong tendency for the ring 3 to move axially to the left as the bars expand. This tendency for the retaining ring to move must be prevented. This is accomplished by a locking structure which transmits the axial loads acting on the retaining ring to the rotor.

Referring now to Fig. 1, the retaining ring 3 defines an inwardly extending flange portion 3a which is mounted on the centering ring 4 with a shrink fit. The right hand end of portion 3a abuts the outwardly extending flange 4a of the centering ring 4. This prevents axial movement of the retaining ring to the right relative to the centering ring. The left hand surface 3b of the retaining ring is in alignment with the side wall 4b of a circumferential groove 4c defined by the centering ring 4.

Disposed in groove 4c and in contact with the surfaces 4b, 3b of the centering ring and retaining ring respectively, is a snap ring 6. The snap ring 6 is a conventional split ring which has an axial dimension equal to that of the groove 4c in the centering ring. When the snap ring is located in place, a circumferential clearance space 12 exists between the ends 6a of the snap ring.

To secure the snap ring from expanding under the effect of centrifugal force, a clamp ring 5 is shrink fitted onto the centering ring 4 at its end thereof. The clamp ring defines an annular recess 5a which receives the snap ring 6. Located between the retaining ring 3 and clamp ring 5 is an axial clearance space 9.

The centering ring 4 defines a bore 11 in which a locking member 7 is disposed. The function of the locking member is to prevent the snap ring 6 from moving circumferentially and to prevent the clamp ring from moving axially relative to the centering ring. The member 7 is a substantially rectangular block which fits in the space 12 defined between the split ends 6a of the snap ring 6. The locking member 7 also defines a lip portion 7a which extends axially outward of the centering ring. After assembly of the ring 5, the lip portion 7a is bent up in a radial direction to lock the clamp ring relative to the centering ring. The upper surface 7b of member 7 is flush with the outer surface 4d of the centering ring to permit the clamp ring to be disposed in place over the locking member.

This retaining ring structure is assembled in the following manner.

The groove 4c is machined in the periphery of the centering ring 4. The retaining ring 3 is then shrunk in place with the flange portion 3a disposed in contact with the surface 4d of the centering ring 4. The inner radial surface 3c of the flange portion 3a is located in abutting relationship with the flange 4a to prevent movement of the retaining ring to the right. The axial dimension of the flange 3a is such that the outer radial surface 3b of the retaining ring is located flush with the inner face 4b of the centering ring groove 4c. A snap ring 6 is then assembled in the groove 4c. The member 7 is then disposed in the bore 11 with the portion 7b extending into the space 12 between the split ends of the snap ring 6. The clamp ring 5 is then shrunk onto the end of the centering ring to hold the snap ring 6 in position. The lip portion 7a of the member 7 is then bent upward to retain the clamp ring against working loose relative to the centering ring. This single lip will be sufficient since, as previously mentioned, there is substantially no axial thrust imposed on the clamp ring 5. The snap ring is made to a larger diameter than the groove and the clamp ring so that it will at all times be elastically biased outwardly against the clamp ring, and therefore will not disturb the balance of the rotor by changing its position. When the retaining ring assembly is completely assembled, the snap ring 6 will abut the upper surface of recess 5a and an annular clearance 10 will be located between the circumferential groove 4c and snap ring 6.

Any axial force on the retaining ring, caused by thermal expansion of the conductor bars 2, will be transmitted through the snap ring 6 to the centering ring 4. The clearance 9 between the retaining ring and clamp ring 5 will prevent the axial forces imposed on the retaining ring from being transmitted to the clamp ring. The sole function of the clamp ring is to hold the snap ring 6 in its groove.

It is to be noted that the retaining ring 3 has no axially or radially extending grooves, holes, or other discontinuities which would reduce its effectiveness in resisting the tremendous centrifugal forces imposed by the conductor end portions.

Thus it will be seen that the retaining ring will be prevented from moving axially as a result of axial forces imposed thereon. The axial forces will be transmitted to the rotor through a snap ring which keys the retaining ring to a centering ring that is shrunk fitted to the rotor. The snap ring is held in place by a clamp ring secured to the rotor and axially spaced from the retaining ring to prevent axial loads acting on the retaining ring from being transmitted to the clamp ring.

It will be obvious to those skilled in the art that numerous changes and substitutions of mechanical equivalents might be made in the construction and assembly of the various components of the retaining ring assembly. For example, the ring 6 could be made in several separate arcuate segments, perhaps with a locking member 7 between each pair of adjacent segments. The invention is not limited to a snap ring of rectangular cross section; nor is it necessary that the retaining ring end surface 3b be flush with the inner face 4b of the groove 4c. The relationship between the shape and location of the snap ring, retaining ring, and centering ring need only be that which will positively transmit axial forces from the retaining ring to the centering ring.

It is, of course, desired to cover by the appended claims all such modifications as fall within the true spirit and scope of the invention.

What I claim as new and desire to secure by Letters Patent in the United States is:

1. In retaining ring structure for a dynamoelectric machine rotor having conductors disposed in axial slots in the rotor body with a plurality of conductor end portions extending circumferentially through an arc around a reduced diameter end portion of the rotor, the combination of a first centering ring member on the reduced diameter end portion of the rotor and spaced axially from the rotor body, a retaining ring member surrounding the conductor end portions and having a first inwardly projecting flange portion contacting the circumferential surface of said first ring member, an outwardly extending flange defined by said centering ring member disposed adjacent said first flange whereby the retaining ring is prevented from moving axially in one direction relative to the centering ring, means for preventing the retaining ring from moving axially in the other direction comprising a snap ring disposed in an annular groove in the circumferential surface of the centering ring member, the snap ring extending radially out of said groove and into contact with an end surface of the retaining ring, whereby axial forces due to thermal expansion of the conductors tend to move the retaining ring axially against the snap ring and are transmitted therethrough to the centering ring, and second means for preventing radial displacement of the snap ring.

2. A retaining ring construction in accordance with claim 1, in which said second means comprises a clamping ring surrounding, and defining a groove adapted to receive said snap ring, the clamp ring being secured to the centering ring member and axially spaced from the adjacent end surface of the retaining ring, whereby axial forces acting on the retaining ring are not transmitted to the clamp ring.

3. Retaining ring construction in accordance with claim 2 with means for preventing circumferential movement of the snap ring and axial movement of the clamp ring, said last mentioned means comprising a key member disposed in a hole defined by said first ring member, said key extending into the circumferential clearance space defined between the ends of the snap ring to prevent circumferential movement of the snap ring, the key also defining an axially extending tongue portion which can be bent over into contact with an adjacent end surface of the clamp ring to resist axial movement thereof.

4. In a retaining ring structure for a dynamoelectric machine rotor having conductors disposed in axial slots in the rotor body with a plurality of conductor end portions extending circumferentially through an arc around a reduced diameter end portion of the rotor, the combination of a first ring member on the reduced diameter end portion of the rotor and spaced axially from the rotor body, a retaining ring member surrounding the conductor end portions, the retaining ring having an inwardly extending flange portion with axially spaced radially extending end surfaces and an inner circumferential surface adapted to contact the outer surface of said first ring member with a shrink fit, means for preventing axial movement of the retaining ring relative to said first ring including an outwardly extending flange defined by said first ring member and adapted to engage one end surface of said flange portion, said first ring member defining a circumferential groove having one radial surface flush with the other end surface of the retaining ring flange portion, a snap ring disposed in said groove and adapted to be engaged by the end surface of the retaining ring, a clamp ring surrounding and defining a groove adapted to receive said snap ring, the clamp ring engaging said first ring member with a shrink fit and being axially spaced from the end surface of the retaining ring whereby axial force imposed on the retaining ring by the conductors is transmitted to the first ring member through the snap ring, and means for preventing the snap ring from moving circumferentially and the clamp ring from moving axially, said last mentioned means comprising a locking member disposed in a hole defined by said first ring member and extending into the space defined between the ends of the snap ring, said locking member having a tongue portion adapted to be bent into contact with an end surface of the clamping ring to prevent axial movement thereof.

5. In a retaining ring structure for a dynamoelectric machine rotor having a plurality of conductor end portions disposed about a reduced diameter end portion of the rotor, the combination of a centering ring member on the reduced diameter portion of the rotor, a conductor retaining ring having one end portion engaging the outer circumference of the centering ring with a shrink fit, and means for preventing the retaining ring shifting axially when the conductors expand thermally comprising a split locking ring member disposed in an annular groove in the outer circumference of said centering ring member and having a radial surface adapted to be engaged by the adjacent end surface of the retaining ring, and a clamping ring member disposed around and engaging said split ring with a shrink fit.

No references cited.